US008962731B2

(12) United States Patent
Kwon et al.

(10) Patent No.: US 8,962,731 B2
(45) Date of Patent: Feb. 24, 2015

(54) PREPARATION METHOD OF METAL NANOBELT

(75) Inventors: Won-Jong Kwon, Daejeon (KR); Sung-Ho Yoon, Seoul (KR); Kyung-Hoon Lee, Gangwon-do (KR)

(73) Assignee: LG Chem, Ltd., Seoul (KR)

( * ) Notice: Subject to any disclaimer, the term of this patent is extended or adjusted under 35 U.S.C. 154(b) by 233 days.

(21) Appl. No.: 13/578,792

(22) PCT Filed: Mar. 10, 2011

(86) PCT No.: PCT/KR2011/001678
§ 371 (c)(1),
(2), (4) Date: Nov. 9, 2012

(87) PCT Pub. No.: WO2011/112021
PCT Pub. Date: Sep. 15, 2011

(65) Prior Publication Data
US 2013/0059984 A1 Mar. 7, 2013

(30) Foreign Application Priority Data

Mar. 11, 2010 (KR) .................. 10-2010-0021854

(51) Int. Cl.
| C08L 79/02 | (2006.01) |
| B22F 1/00 | (2006.01) |
| B22F 7/04 | (2006.01) |
| B22F 9/20 | (2006.01) |
| C09D 11/52 | (2014.01) |

(52) U.S. Cl.
CPC .............. *B22F 1/0062* (2013.01); *B22F 7/04* (2013.01); *B22F 9/20* (2013.01); *C09D 11/52* (2013.01); *B22F 1/0025* (2013.01); *Y10S 977/89* (2013.01)
USPC ........... 524/403; 525/435; 525/535; 427/123; 977/890

(58) Field of Classification Search
CPC ......... B22F 1/0062; B22F 9/20; B22F 1/0025
USPC ....................................... 524/403
See application file for complete search history.

(56) References Cited

U.S. PATENT DOCUMENTS

| 7,101,961 B2 | 9/2006 | Wang et al. |
| 2012/0128996 A1* | 5/2012 | Kwon et al. .................. 428/577 |

FOREIGN PATENT DOCUMENTS

| CN | 1621432 | 6/2005 |
| CN | 101288849 | 10/2008 |
| CN | 101353477 | 1/2009 |
| JP | H04202707 A | 7/1992 |
| JP | 2004-161570 A | 6/2004 |
| JP | 2004-182518 A | 7/2004 |
| JP | 2005524000 A | 8/2005 |
| JP | 2007528616 A | 10/2007 |
| JP | 2007535413 A | 12/2007 |
| JP | 2008-156745 | 7/2008 |
| JP | 2009-037752 | 2/2009 |
| KR | 1020090065177 A | 6/2009 |
| KR | 1020090113990 A | 11/2009 |
| WO | WO 2010/020123 | * 3/2010 |

OTHER PUBLICATIONS

Jian Xu et al., Solution route to inorganic nanobelt-conducting organic polymer core-shell nanocomposites, Journal of Polymer Science Part A; Polymer Chemistry, Jan. 7, 2005, vol. 43, Issue 13, pp. 2892-2900.
Xu, Jian et al., "Solution Route to Inorganic Nanobelt-Conducting Organic Polymer Core-Shell Nanocomposites"; Journal of Polymer Science Part A: Polymer Chemistry, 2005, vol. 43f, pp. 2892-2900.
Huang, Ting-Kai et al., "Growth of Cu Nanobelt and Ag Belt-Like Materials by Surfactant-Assisted Gaklvanic Reductions", Langmuir 2007, vol. 23, pp. 5722-5726.
Huang, Ting-Kai et al., "Glocose Sensing by Electrochemically Grown Copper Nanobelt Electrode", Journal of Electroanalytical Chemistry, 2009, vol. 636, pp. 123-127.

\* cited by examiner

*Primary Examiner* — Doris Lee
(74) *Attorney, Agent, or Firm* — McKenna Long & Aldridge, LLP

(57) ABSTRACT

This disclosure relates to a method of preparing a metal nanobelt. According to the method, a metal nanobelt having various applicabilities, for example, capable of easily forming a conductive film or a conductive pattern with excellent conductivity, may be easily prepared by a simple process at room temperature and atmospheric pressure. The method comprises reacting a conductive polymer and a metal salt.

12 Claims, 4 Drawing Sheets

PREPARATION METHOD OF METAL NANOBELT

This application is a National Stage Entry of International Application No. PCT/KR2011/001678, filed Mar. 10, 2011, and claims the benefit of Korean Application No. 10-2010-0021854, filed on Mar. 11, 2010, which is hereby incorporated by reference in its entirety for all purposes as if fully set forth herein.

FIELD OF THE INVENTION

This disclosure relates to a method of preparing a metal nanobelt. More specifically, this disclosure relates to a method of preparing a metal nanobelt that may easily prepare a metal nanobelt having various applicabilities by a simple process at room temperature and atmospheric pressure.

DESCRIPTION OF THE RELATED ART

Various semiconductor devices, display devices such as PDP or LCD, solar cells or sensors and the like include various elements having conductivity such as an electrode, wiring, or an electromagnetic shielding film. One of the most commonly used methods of forming the conductive element comprises printing microparticles having conductivity, for example, a conductive ink composition comprising conductive nanoparticles and a solvent, on a substrate, and then, heat treating (for example, firing and drying) it to form various conductive patterns or conductive films making up various conductive elements on a substrate.

However, to form a conductive film or a conductive pattern using so far developed conductive nanoparticles, a process wherein a conductive ink composition comprising the same is printed on a substrate, and then, fired at high temperature to remove an organic substance (for example, an organic solvent) included in the conductive ink composition and reduce or melt-connect the conductive nanoparticles is required. This is to reduce the conductive nanoparticles included in the conductive ink composition or melt-connect the conductive nanoparticles so as to form a uniform conductive pattern or conductive film with excellent conductivity.

However, due to the requirement of the high temperature firing process, there has been a limitation in the kinds of a substrate on which a conductive film or conductive pattern may be formed. Accordingly, there has been a continuous demand for a conductive ink composition or conductive nanoparticle that may form a conductive pattern, etc. with excellent conductivity even if a lower temperature firing process or other heat treatment process is applied.

Therefore, various conductive ink compositions or conductive nanoparticles for low temperature firing have been suggested, however, there is a limitation in that firing temperature may not be sufficiently lowered or sufficient conductivity may not be obtained.

SUMMARY OF THE INVENTION

Object of the Invention

The present invention provides a method of preparing a metal nanobelt that may easily prepare a metal nanobelt having various applicabilities, which enables formation of a conductive pattern or a conductive film with excellent conductivity even under an environment requiring low temperature firing, by a simple process at room temperature and atmospheric pressure.

Technical Solution

According to the present invention, a method of preparing a metal nanobelt comprising reacting a conductive polymer and a metal salt is provided.

In the preparation method, the reaction may be conducted at a temperature of 1 to 70° C. and a pressure of 1 to 2 atm, for 0.1 hours to 14 days.

According to the preparation method, in the reaction step, the metal may be reduced and arranged on the conductive polymer so as to form a metal nanobelt.

And, the metal nanobelt formed in the reaction step may have a length of 500 nm or more, a length/width ratio of 10 or more, and a width/thickness ratio of 3 or more, and more specifically, the metal nanobelt may have a length of 1 μm~2000 μm, a width of 30 nm~100 μm, and a thickness of 10~500 nm.

And, in the preparation method, the reaction may be conducted in the presence of a reducing agent.

Hereinafter, a metal nanobelt, a preparation method thereof, and a conductive ink composition and a conductive film comprising the same according to embodiments of the invention will be explained in detail.

Unless otherwise described, some terms used throughout the specification are defined as follows.

The term "metal nanobelt" used herein refers to a nanostructure that comprises a metal and a conductive polymer, and has a belt-like shape long connected in one direction as seen on the plane. The longest straight-line distance from one end of the "metal nanobelt" to the opposite end in the belt-shaped long connected direction is defined as a "length", and the longest straight-line distance from one end of the "metal nanobelt" to the opposite end in a vertical direction to the "length" direction on the plane is defined as a "width". And, the longest straight-line distance between the upper side and the lower side of the metal nanobelt having a belt shape in a vertical direction to a plane made by the "length" direction and the "width" direction is defined as a "thickness". The metal nanobelt has at least one nanoscale size of the length, width or thickness, at least nanoscale thickness, and has a several times or more larger length than a width and several times or more larger width than a thickness, and thereby, has a belt shape wherein rectangles or similar polygons with thin thicknesses are long connected like a belt And, the description that the metal nanobelt "does not substantially comprise a metal oxide" refers to the case wherein the "metal" included in the metal nanobelt exists in a non-oxidized state and thus the metal nanobelt does not comprise a metal oxide at all, or the case wherein only a small amount of metals, for example, less than 1 wt % or less than 0.1 wt % of metals based on the weight of the metal nanobelt are inevitably oxidized during the preparation or use, and thus, the metal nanobelt comprises only a small amount of metal oxides corresponding thereto.

And, the term "a conductive ink composition" refers to a composition that may be printed or coated on a substrate formed of a polymer, glass or metal, etc. to form a film or a pattern, irrespectively of whether it is a "paste" with relatively high viscosity or has low viscosity like water.

And, the term "a conductive film" refers to a membrane, film or pattern that is formed on a substrate made of a polymer, glass or metal, etc. to have thermal or electrical conductivity.

And, a description that a part "comprises", "contains" or "has" a constitutional element means that any other constitutional elements may be further added without limiting the addition of other constitutional elements, unless otherwise described.

Meanwhile, according to one embodiment of the invention, a method of preparing a metal nanobelt comprising reacting a conductive polymer and a metal salt is provided.

As results of the experiments of the inventors, it was found that a metal nanobelt may be prepared by reacting the conductive polymer and metal salt. Specifically, if the reaction process is passed, a metal having relatively high reduction potential is reduced from the metal salt, and arranged and combined on the conductive polymer to prepare the metal nanobelt. Thus, the metal is reduced through the medium of the conductive polymer, and the resultantly formed metal microparticles are long connected in a belt shape with a wide width on the conductive polymer so as to prepare the metal nanobelt.

The non-limiting principles of the formation of the metal nanobelt will be explained in detail.

In the reaction process, after the metal salt is reduced to a metal, a conductive polymer is combined on the specific crystal side of the metal nanocrystal to stabilize high surface energy of the metal nanocrystal. The stabilization energy is referred to as a capping energy, which may differ according to the kind of the conductive polymer or metal included in the metal nanobelt, the kinds of the crystal side or metal nanocrystal, and the like. And, as the absolute value of the capping energy is larger, the conductive polymer may combine on the crystal side of the metal nanocrystal to more stabilize the surface energy, and thus, the conductive polymer combines on the specific crystal side with largest absolute value of the capping energy with the conductive polymer, among the crystal sides of the metal nanocrystal.

By this principle, a specific crystal side of the metal nanocrystal predominantly combines with the conductive polymer and the metal may be arranged on the conductive polymer in a direction of a different crystal side (for example, a crystal side having a small absolute value of the capping energy with the conductive polymer), and thus, the metal nanobelt may be grown and formed in a length direction of the arrangement direction of the metal.

Particularly, since in the reaction process, high temperature and high pressure reaction conditions are not required and for example, the reactant may be reacted in a single step in a dispersion of room temperature and atmospheric pressure, the metal nanobelt may be prepared by a simple process, and furthermore, it may be easily prepared at room temperature and atmospheric pressure, or low temperature and pressure equivalent thereto, as after-mentioned.

Meanwhile, in the preparation method, the reaction may be conducted at a temperature of about 1 to 70° C. and a pressure of about 1 to 2 atm, for about 0.1 hours to 14 days, preferably at a temperature of about 1 to 65° C. and approximately atmospheric pressure, for 10 hours to 7 days. By progressing the reaction at room temperature and atmospheric pressure, or relatively low temperature and pressure equivalent thereto, metal may be gradually uniformly reduced and arranged on the conductive polymer and the metal nanobelt may be appropriately prepared. To the contrary, if the reaction temperature or pressure is too low, the metal nanobelt may not be properly formed. And, if the reaction temperature or pressure is too high, a reaction speed of the conductive polymer with a metal salt may become too rapid, and thus metal may not be uniformly arranged and combined on the conductive polymer, and a capping effect for the crystal side of the conductive polymer due to surface energy may decrease. For this reasons, metal or conductive polymer may be agglomerated each other, and a metal nanostructure of another shape, for example spherical metal nanoparticles, may be formed more than a metal nanobelt of a belt shape, thus lowering yield of the metal nanobelt.

Meanwhile, the metal nanobelt prepared by the above preparation method may have the following shape, scale and characteristics.

The metal nanobelt prepared by the above method may have a length of about 500 nm or more, a length/width ratio of about 10 or more, and a width/thickness ratio of about 3 or more. According to more specific embodiment, the metal nanobelt may have a length of about 1 $\mu m$~2000 $\mu m$, preferably about 2 $\mu m$~1000 $\mu m$, more preferably about 2 $\mu m$~100 $\mu m$. And, the metal nanobelt may have a width of about 30 nm~100 $\mu m$, preferably about 100 nm~10 $\mu m$, more preferably about 100 nm~2 $\mu m$. And, the metal nanobelt may have a thickness of about 10~500 nm, preferably about 10~300 nm, more preferably about 20~250 nm.

And, the metal nanobelt may have a length/width ratio of about 10 to 20000, preferably about 10 to 1000, more preferably about 10 to 200. And, the metal nanobelt may have a width/thickness ratio of about 3 to 6000, preferably about 3 to 500, more preferably about 3 to 50.

As results of the experiment of the inventors, it was found that a nanostructure of a belt shape with a nanoscale thickness suitable for a conductive nanostructure, a relatively wide width and a length of minimum about 500 nm to 100 $\mu m$ or more, maximum about 2000 $\mu m$, i.e., the above metal nanobelt may be obtained by reacting a conductive polymer and a metal salt at an appropriate speed. The metal nanobelt is connected with a long length and has a somewhat wide width, compared to the existing conductive nanostructure or conductive nanoparticle, thus having a belt shape. And, since the metal nanobelt may be prepared by the above reaction process at room temperature and atmospheric pressure, it may not substantially comprise a metal oxide.

Namely, the metal nanobelt prepared by the above method may be in the state wherein metal microparticles with at least nanoscale thickness are connected with a wide width and a sufficiently long length, and it may not substantially comprise a metal oxide. Therefore, if a conductive ink composition comprising the metal nanobelt is printed on a substrate, a conductive film, for example, a conductive membrane or a conductive pattern formed therefrom may have sufficiently excellent conductivity without progressing a high temperature firing process that has been applied for reducing or melt-connecting conductive nanoparticles. And, the metal nanobelt may comprise a single metal ingredient such as gold (Au), silver (Ag) or copper (Cu). Thus, by forming the metal nanobelt so as to comprise a single metal ingredient such as gold (Au), silver (Ag) or copper (Cu), and the like exhibiting lower resistance, a conductive film formed therefrom may have more excellent conductivity.

Therefore, the metal nanobelt may be very preferably used for a conductive ink composition for forming a conductive pattern or a conductive film of various semiconductor devices, display devices or solar cells, and the like, particularly under an environment requiring low temperature firing.

In addition, if a metal nanobelt is prepared by the above method using a noble metal such as gold (Au), platinum (Pt), palladium (Pd), iridium (Ir), rhodium (Rh) or ruthenium (Ru) and the like, the metal nanobelt may be preferably used as various catalysts. Specifically, the existing noble metal catalysts predominantly have a particle shape, and thus have a limitation in realizing a wide surface area, while the metal nanobelt formed of the noble metal may realize a wide surface area due to the belt shape using a small amount of the noble metal. And, since the area of a specific crystal side of the noble metal exposed on the surface of the metal nanobelt may be maximized, if the metal nanobelt prepared from the noble metal is used as a catalyst, a contact area with a reactant may increase using a smaller amount of the noble metal to further improve catalytic activity and provide an efficient and economical catalyst.

As explained, the metal nanobelt enables formation of a conductive pattern or a conductive film exhibiting excellent conductivity even under low temperature heat treatment environment, or formation of a catalyst having excellent activity, thus having various applicabilities. According to one embodiment of the invention, the metal nanobelt having various applicabilities may be easily prepared by a simple process of reacting a conductive polymer with a metal salt at relatively low temperature and pressure.

Meanwhile, the metal nanobelt may not substantially comprise a metal oxide. The meaning of the description "not substantially comprising a metal oxide" is as explained above. As explained above, since the metal nanobelt may be formed by the reaction of a metal salt and a conductive polymer at room temperature and atmospheric pressure, or low temperature or pressure equivalent thereto, oxidation of a metal ingredient that has been caused by a high temperature reaction process for preparation of conductive nanoparticles may be minimized, and thus, the metal nanobelt may not substantially comprise a metal oxide. Thereby, even if a high temperature firing process that has been progressed for reducing conductive nanoparticles included in a conductive ink composition after printing the conductive ink composition is not separately progressed, a conductive film formed from the metal nanobelt may exhibit excellent conductivity.

And, the metal nanobelt may comprise a conductive metal, a noble metal, or an alloy thereof, which exhibits excellent conductivity or may be used as a catalyst, and for example, it may comprise at least one metal selected from the group consisting of gold (Au), silver (Ag), copper (Cu), platinum (Pt), iridium (Ir), rhodium (Rh), and ruthenium (Ru). Thus, the metal nanobelt and various conductive patterns or conductive films formed from a conductive ink composition comprising the same may exhibit more excellent conductivity, or the metal nanobelt may be more suitably used as a catalyst. Thereby, the metal nanobelt may be appropriately applied for various fields such as a catalyst or a conductive ink composition for formation of a conductive film by variously controlling the metal ingredients making up the metal nanobelt.

And, the metal nanobelt may have a belt shape because a metal is reduced and arranged on the conductive polymer, and thus, it may comprise only one kind of metal, for example, gold (Au), silver (Ag), copper (Cu), platinum (Pt), palladium (Pd), iridium (Ir), rhodium (Rh), or ruthenium (Ru). Namely, since a metal is arranged on the conductive polymer to form a metal nanobelt of a belt shape, it is not required that two or more kinds of metal ingredients should be comprised and one or more kind of the metal ingredients should form a backbone of a belt shape or a basic template, and the metal nanobelt may comprise single metal ingredient. Therefore, a metal nanobelt consisting of a metal ingredient suitable for each application field may be easily obtained, and the metal nanobelt may be more appropriately applied for various fields such as a catalyst or a conductive film.

The above explained metal nanobelt enables formation of various conductive patterns or conductive films exhibiting excellent conductivity even if a high temperature firing process is not applied after printing a conductive ink composition comprising the same on a substrate formed of a polymer, a glass or a metal. Particularly, the metal nanobelt and a conductive ink composition comprising the same do not require a high temperature firing process and may be applied on a substrate formed of any material to form various conductive patterns or conductive films. Therefore, the metal nanobelt may be very preferably applied for an ink composition for formation of various conductive films included in various display devices such as PDP or LCD, semiconductor devices or solar cells, for example, various conductive membranes or conductive patterns such as various electrodes, wirings or an electromagnetic shielding film. For example, the metal nanobelt may be printed on a transparent substrate and applied for forming a transparent conductive film such as a transparent conductive membrane included in a touch panel, applied for forming various wiring patterns or electrodes of a semiconductor substrate, or applied for forming various wiring patterns, electrodes or an electromagnetic shielding filter of various display devices. And, since the metal nanobelt may exhibit excellent conductivity for various heats, it may be also applied for forming various thermal conductive films. Particularly, the metal nanobelt may be more preferably applied under an environment requiring a low temperature firing.

In addition, in case the metal nanobelt is formed of a noble metal, the metal nanobelt may be very preferably applied as catalysts of various reactions. Specifically, since the noble metal nanobelt has a belt shape wherein the noble metal ingredient is arranged on a conductive polymer, it may realize a wide surface area of the noble metal ingredient due to the belt shape even with a relatively low content of the noble metal. And, the area of a specific crystal side of the noble metal exposed on the surface of the nanobelt may be maximized by controlling the arrangement or combination state of the noble metal on the surface of the nanobelt. Therefore, if the noble metal nanobelt is used as a catalyst, a contact area between a reactant and the catalyst ingredient (noble metal ingredient) may increase with a smaller amount of the noble metal thus improving catalyst activity and efficiency.

Meanwhile, according to one embodiment of the preparation method of the above explained metal nanobelt, a dispersion wherein a conductive polymer and a metal salt are mixed is formed, and then, the dispersion is maintained at a constant temperature and pressure, thereby progressing a reaction of the conductive polymer and the metal salt. After the reaction is progressed, the formed metal nanobelt may be separated to finally obtain a metal nanobelt. At this time, the reaction may be conducted at room temperature and atmospheric pressure, or low temperature and pressure equivalent thereto, as explained above.

In the preparation method, any known conductive polymers, for example, polypyrrole, polyaniline, polythiophene, or a copolymer thereof may be used as the conductive polymer.

And, as the metal salt, any salt of a metal or a noble metal exhibiting conductivity, commonly used as a precursor for forming a metal nanoparticle may be used without specific limitation. For example, nitrate, sulfate, acetate, halogen salt, carbonate, lactate, cyanide salt, cyanate, or sulfonate, etc. of a conductive metal or noble metal may be used as the metal salt.

More specifically, in case a metal nanobelt comprising silver (Ag) with excellent conductivity as a metal ingredient is to be prepared, silver nitrate ($AgNO_3$), silver sulfate ($Ag_2SO_4$), silver acetate ($Ag(CH_3COO)$), silver halide such as silver fluoride (AgF), silver chloride (AgCl), silver bromide (AgBr) or silver iodide (AgI), silver cyanide (AgCN), silver cyanate (AgOCN), silver lactate ($Ag(CH_3CHOHCOO)$), silver carbonate ($Ag_2CO_3$), silver perchlorate (AgClO$_4$), silver acetate trifluoride (Ag(CF$_3$COO)) or silver trifluoride methyl sulfonate (Ag(CF$_3$SO$_3$)), and the like may be used as the metal salt.

And, in addition to the above illustrated conductive polymers or metal salts, any conductive polymers or various salts of conductive metals or noble metals may be used.

And, although only a metal salt and a conductive polymer may be reacted in order to prepare the metal nanobelt, in case a metal ingredient of the metal salt, i.e., a metal ingredient to be included in the metal nanobelt has relatively low reduction potential, by progressing the reaction of the metal salt and the conductive polymer in the presence of a reducing agent, a metal ingredient may be more effectively reduced from the metal salt on the conductive polymer to accelerate the reaction and increase the yield. Thereby, the metal nanobelt may be easily obtained with high yield.

The kinds of the reducing agents that may be used may be varied according to the kinds of a metal ingredient of the metal salt, and those having lower standard reduction potential than the metal salt or corresponding metal ion may be selected and used so as to reduce corresponding metal salt. As the reducing agent, those commonly known according to the kinds of each metal ingredient may be used without specific limitations, and for example, a multivalent phenol-based compound such as hydrazine, ascorbic acid, hydroquinone, resorcinol or cathecol; an amine-based compound such as triethylamine; a pyridine-based compound such as dimethylaminopyridine; a multivalent alcohol-based compound such as ethylene glycol, or a mixture thereof may be used.

And, the reaction of the metal salt and the conductive polymer may be conducted in a solvent selected from the group consisting of water, alcohol, acetone, methyl ethyl ketone (MEK), ethylene glycol, formamide (HCOOH), dimethylformamide (DMF), dimethylacetamide (DMAc), dimethyl sulfoxide (DMSO), N-methylpyrrolidone (NMP), and a mixed solvent thereof.

For example, in the case of an aqueous conductive polymer such as polyaniline, the reaction may be progressed by dispersing it in water and adding a metal salt thereto. And, according to the kinds of a conductive polymer and a metal salt, the reaction of the conductive polymer and the metal salt may be progressed by obtaining a dispersion of the conductive polymer and the metal salt using the above illustrated or commonly known various solvents.

The metal salt may be added as a solid, or it may be made into a solution and then added. If the obtained mixed dispersion is maintained at the above described temperature and pressure condition for a predetermined time, a metal nanobelt is formed in the dispersion. In the reaction process, the addition order of each reactant or forming method and mixing order of the dispersion, and the like may be obviously modified by a person having ordinary knowledge in the art.

The metal nanobelt prepared by the above method may be mixed with a solvent to provide a printable conductive ink composition or provide a catalyst of various reactions, etc.

The conductive ink composition comprises a metal nanobelt that may not substantially comprise a metal oxide, consist of a low resistance metal ingredient, and have a belt shape wherein metal microparticles having nanoscale size (thickness) are long connected with wide width. Therefore, if the ink composition is printed on a substrate, a conductive film such as various conductive membranes or conductive patterns exhibiting excellent conductivity may be formed without applying a high temperature firing process that has been progressed for reducing or melt-connecting conductive nanoparticles.

Specifically, if the conductive ink composition is printed or coated on a substrate and then simply dried or heat treated at low temperature to remove the solvent, a conductive film such as various conductive membranes or conductive patterns comprising a plurality of nanobelts that do not substantially comprise a metal oxide and have a belt shape wherein metal films having nanoscale thickness are long connected may be formed, and thus, the conductive membrane or conductive pattern may exhibit very excellent conductivity.

Therefore, the conductive ink composition may be preferably applied for forming various conductive films such as various conductive membranes or conductive patterns of electrodes, wirings or an electromagnetic shielding film included in a display device such as PDP or LCD, a semiconductor device or a solar cell, or a thermal conductive film. For example, the conductive ink composition may be printed on a transparent substrate and applied for forming a transparent conductive membrane included in a touch panel, applied for forming various wiring patterns or electrode of a semiconductor substrate, or applied for forming various wiring patterns, electrodes or an electromagnetic shielding filter of various display devices. Particularly, the conductive ink composition may be more preferably applied under an environment requiring low temperature firing, and since it does not require high temperature firing, it may overcome a limitation of the kinds of applicable substrates.

And, the metal nanobelt may be provided as a catalyst of various reactions, and it may comprise a suitable noble metal ingredient according to the reaction. Since the catalyst comprises a metal nanobelt containing a noble metal ingredient instead of common noble metal microparticles (noble metal nanoparticles), a contact area of the noble metal ingredient having a catalytic activity and a reactant may be comparatively increased. Thus, it may exhibit comparatively excellent activity even with a low content of the noble metal ingredient.

Meanwhile, a conductive ink composition or a catalyst comprising the above explained nanobelt may have a composition of a conductive ink composition or a noble metal catalyst commonly known to a person having ordinary knowledge in the art, except that it comprises a metal nanobelt instead of common metal nanoparticles or a metal nanostructure of a different shape.

Effect of the Invention

As explained, according to the present invention, various conductive patterns or conductive films exhibiting excellent conductivity may be formed without application of a high temperature firing process, or a method of preparing a metal nanobelt having various applicabilities such as providing of a catalyst having excellent activity with low content of a noble metal may be provided.

Particularly, according to the preparation method of the present invention, the metal nanobelt may be easily prepared by a very simple process at low temperature and pressure and applied for various fields.

EXAMPLES

Hereinafter, the present invention will be explained in detail by the following Examples. However, these Examples are only to illustrate the invention, and the scope of the invention is not limited thereto.

A. Preparation of a Reagent

Reagents used for preparation of the silver nanobelt as after-mentioned are as follows, and they are used as purchased without specific purification.

aniline hydrochloride (Aldrich, 97%), 2-aminobenzoic acid (Aldrich, 99%), 2-aminophenol (Aldrich, 97%), 1,3-phenylenediamine (Aldrich, 99+%), 1,3-propane sultone (Aldrich, 97%), pyrrole 1,3-phenylenediamine (Acros, 99%), ammonium persulfate (Acros, 98%), HCl (Duksan), HNO$_3$ (Duksan), AgNO$_3$ (Acros, 99%)

B. Synthesis of a Conductive Polymer

Synthesis Example 1

Synthesis of N-(1',3'-phenylenediamino)-3-propane sulfonate

In a 1 L flask, 54.07 g (0.500 mol) of m-phenylenediamine and 61.07 g (0.500 mol) of 1,3-propane sulfone were dissolved in 500 ml of THF, and the mixture was refluxed and agitated for 24 hours. It was cooled to room temperature and filtered with a glass filter, and then, washed with 1000 ml of a THF:n-Hex 1:1 (v/v) mixed solvent and vacuum dried to obtain 108.52 g of gray-blue powder (0.472 mol, 94.3% yield). The obtained N-(1',3'-phenylenediamino)-3-propane sulfonate has a Chemical Structure of the reaction product of the following Reaction Formula a).

Reaction Formula a): N-(1',3'-phenylenediamino)-3-propane sulfonate

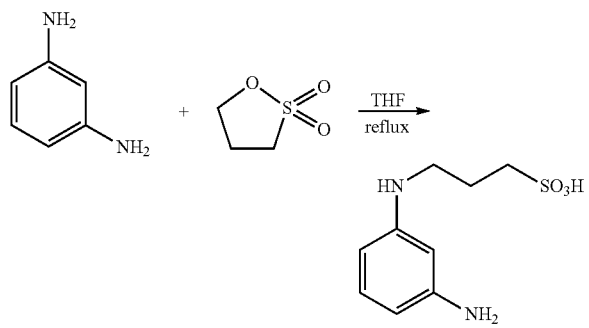

Synthesis Example 2

Figure 1:
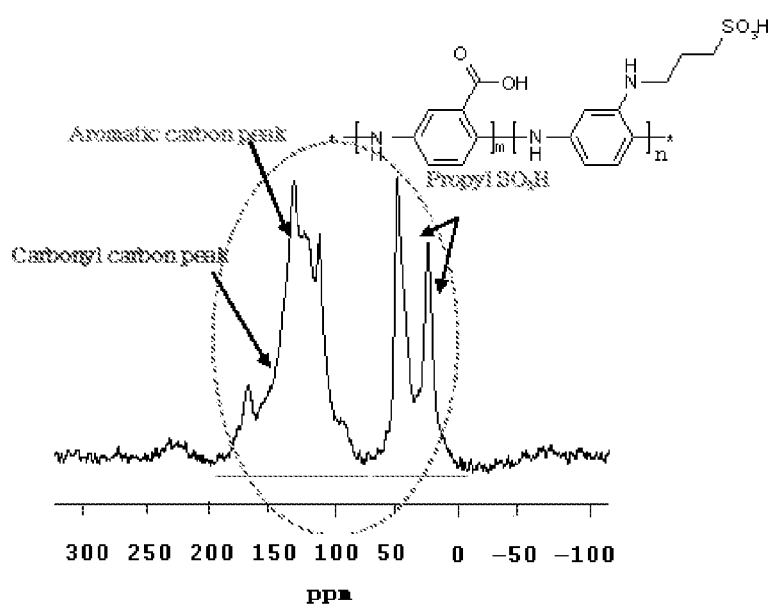
FIG. 1 shows a solid state carbon NMR spectrum of the conductive polymer obtained in Synthesis Example 2.

Synthesis of P[anthranilic acid]$_{0.5}$-[N-(1',3'-phenylenediamino)-3-propane sulfonate]$_{0.5}$ 3.43 g of anthranilic acid and 5.75 g of N-(1',3'-phenylenediamino)-3-propane sulfonate were dissolved in a mixed solution of 300 ml of a HCl solution and 100 ml of EtOH, and 200 ml of 0.2 M HCl solution in which 14.21 g of ammonium persulfate is dissolved was added thereto over 10 minutes, and then, the mixture was agitated for 24 hours. 3.6 L of acetone was added to the solution to obtain a polyaniline polymer precipitate, which was centrifuged at 4000 rpm for 1 hour to separate the precipitate. And then, it was washed with a mixed solution of acetone/0.2 M HCl (6:1 v/v) 3 times and dried to obtain 6.12 g of P[anthranilic acid]$_{0.5}$-[N-(1',3'-phenylenediamino)-3-propane sulfonate]$_{0.5}$ (66.4% yield). The compositional ratio of two repeat units of the obtained polyaniline was confirmed as 52:48 (analyzed by solid state NMR), and the weight average molecular weight was confirmed as about 2830 (analyzed by GPC). A solid state carbon NMR spectrum of the conductive polymer is shown in FIG. 1. And, it was confirmed that the conductive polymer of P[anthranilic acid]$_{0.5}$-[N-(1',3'-phenylenediamino)-3-propane sulfonate]$_{0.5}$ has a Chemical structure of the reaction product of the following Reaction Formula b).

Reaction Formula b): P[anthranilic acid]$_{0.5}$-[N-(1',3'-phenylenediamino)-3-propane sulfonate]$_{0.5}$

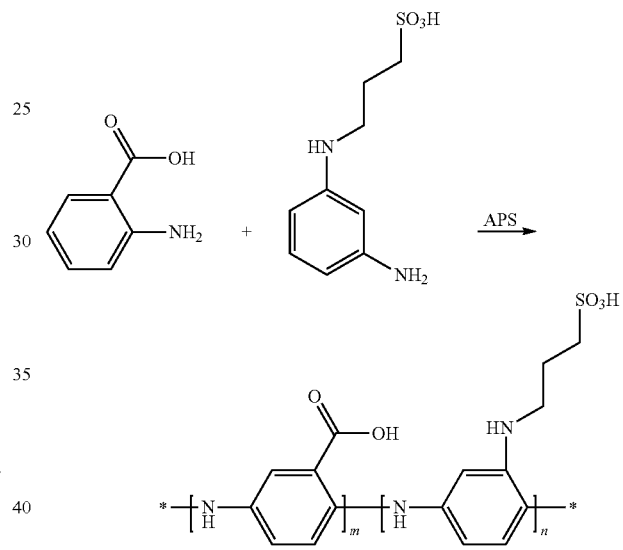

Synthesis Example 3

Synthesis of P[ANi]$_{0.5}$-[N-(1',3'-phenylenediamino)-3-propane sulfonate]$_{0.5}$ 4.72 g of P[ANi]$_{0.5}$-[N-(1',3'-phenylenediamino)-3-propane sulfonate]$_{0.5}$ was obtained by the same method as Synthesis Example 2, except using 3.24 g of aniline hydrochloride instead of 3.43 g of anthranilic acid. It was confirmed that the obtained P[ANi]$_{0.5}$-[N-(1',3'-phenylenediamino)-3-propane sulfonate]$_{0.5}$ has a Chemical structure of the following Chemical Formula c).

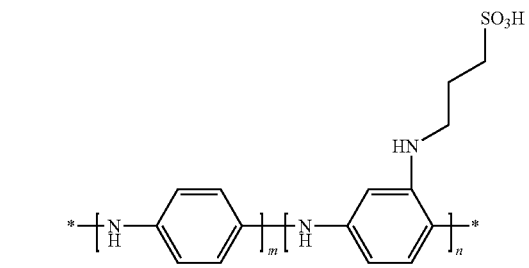

c) P[ANi]$_{0.5}$-[N-(1',3'-phenylenediamino)-3-propane sulfonate]$_{0.5}$

Synthesis Example 4

Synthesis of P[pyrrole]$_{0.5}$-[N-(1',3'-phenylenediamino)-3-propane sulfonate]$_{0.5}$ 4.72 g of P[pyrrole]$_{0.5}$-[N-(1',3'-phenylenediamino)-3-propane sulfonate]$_{0.5}$ was obtained by the same method as Synthesis Example 2, except using 1.68 g of pyrrole instead of 3.43 g of anthranilic acid. It was confirmed that the obtained P[ANi]$_{0.5}$-[N-(1',3'-phenylenediamino)-3-propane sulfonate]$_{0.5}$ has the Chemical structure of the following Chemical Formula d).

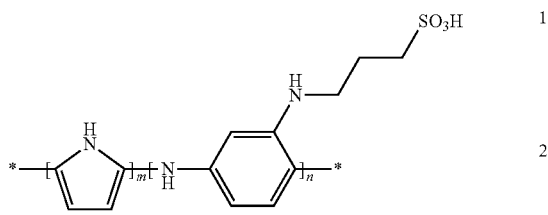

d) P[pyrrole]$_{0.5}$-[N-(1',3'-phenylenediamino)-3-propane sulfonate]$_{0.5}$

C. Synthesis of Silver (Ag) Nanobelt

Example 1

Synthesis of Silver (Ag) Nanobelt 25 mg of the conductive polymer P[anthranilic acid]$_{0.5}$-[N-(1',3'-phenylenediamino)-3-propane sulfonate]$_{0.5}$ prepared in Synthesis Example 2 and 100 mg of AgNO$_3$ were dispersed in 50 ml of distilled water and allowed to stand at 25° C. for 5 days. The silver nanobelt mass sunk to the bottom was filtered using a paper filter and washed with 50 ml of distilled water, and then, dried properly to obtain 16 mg of purified nanobelt.

Figure 2:
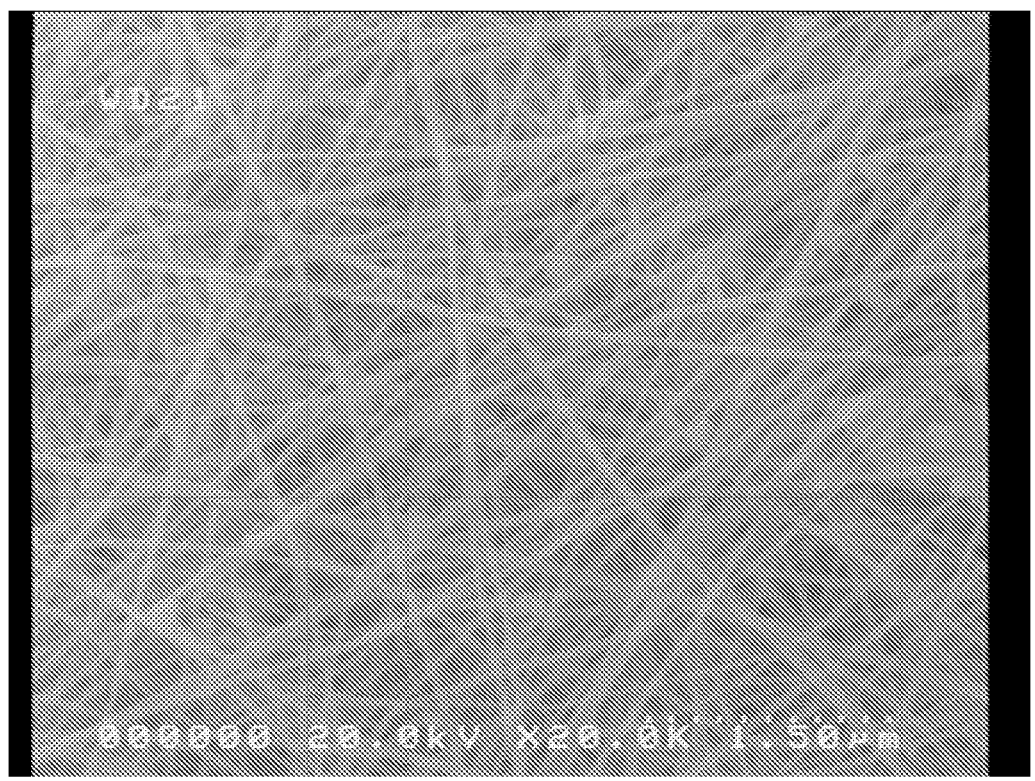
FIGS. 2 and 3 are SEM images of the nanobelt obtained in Example 1.
Figure 3:
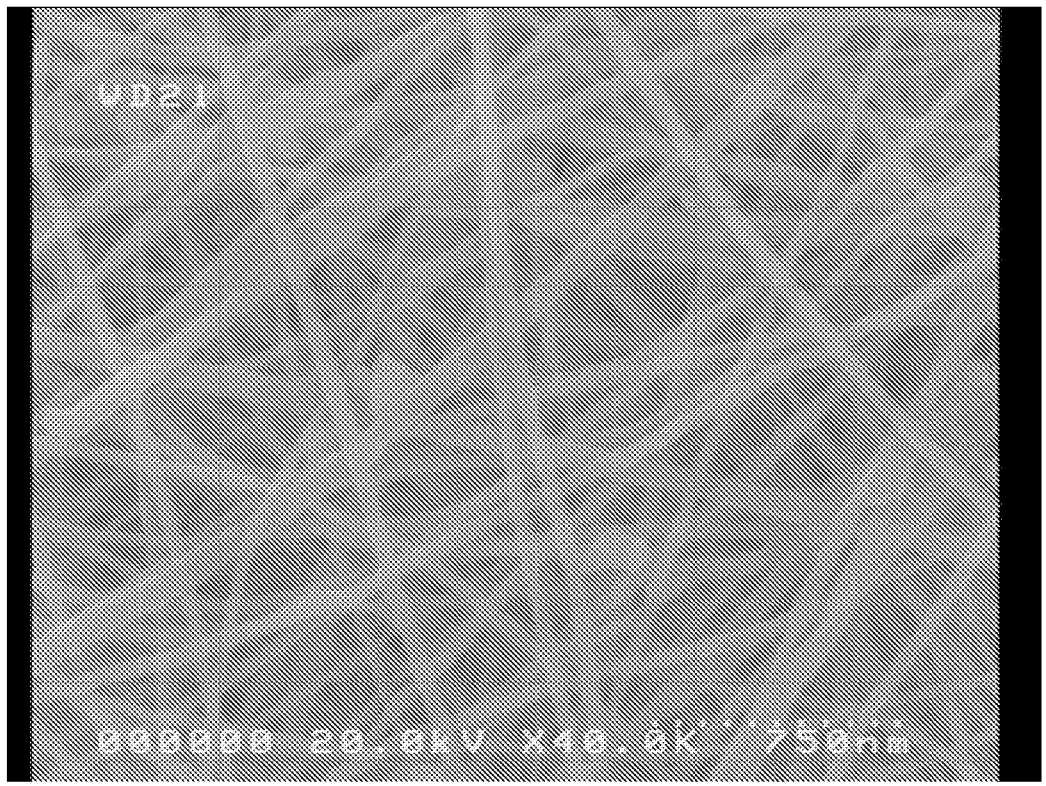
Figure 4:
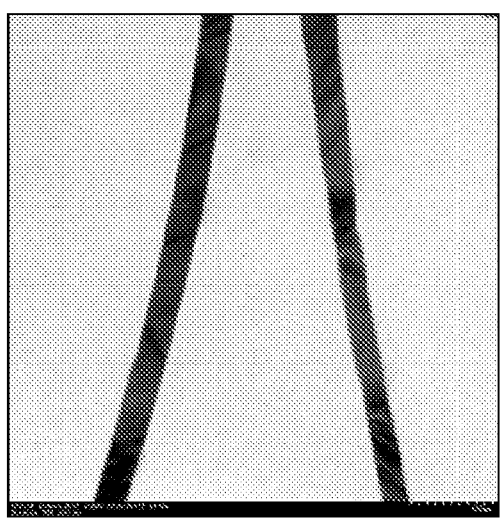
FIG. 4 is a TEM image of the nanobelt obtained in Example 1.

SEM images of the nanobelt obtained in Example 1 are shown in FIG. 2 and FIG. 3, and the TEM image is shown in FIG. 4. As result of measuring the size of the obtained nanobelt using SEM, it is confirmed that it has a belt shape with a width of about 40~60 nm, a thickness of about 10~20 nm, a length of about 1 um or more (provided that the width/thickness ratio is 3 or more).

Example 2

Figure 5:
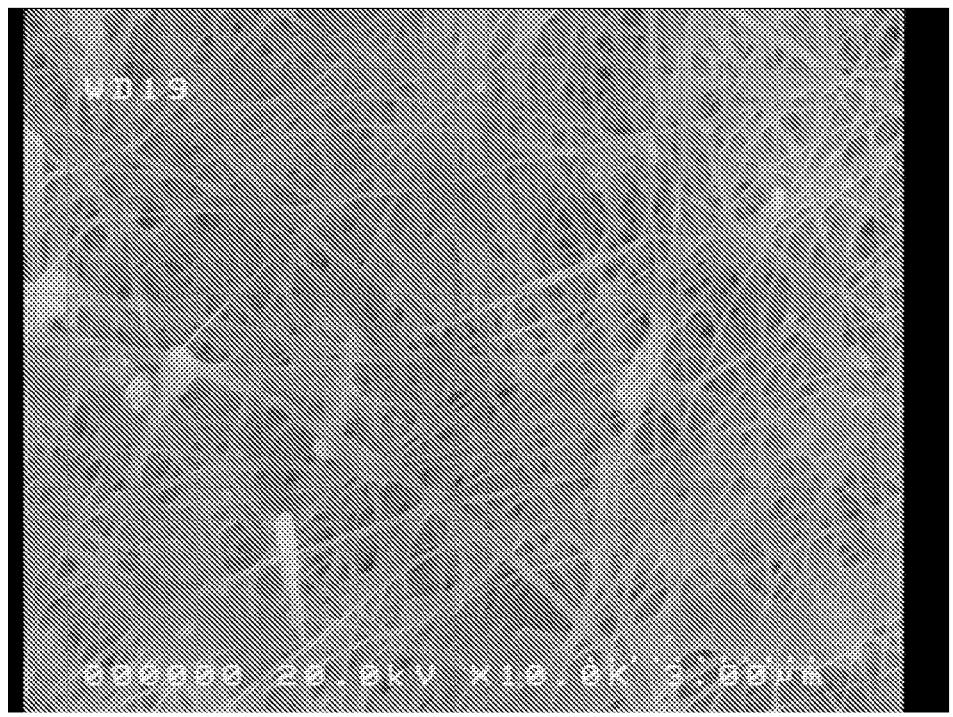
FIG. 5 is an SEM image of the nanobelt obtained in Example 2.

Synthesis of Silver (Ag) Nanobelt 6 mg of a silver nanobelt was obtained by the same method as Example 1, except that the reaction temperature was 40° C. and the reaction time was 42 hours. The SEM image of the obtained nanobelt is shown in FIG. 5. It is confirmed by the SEM image that the silver nanobelt has the same scale as Example 1.

Example 3

Figure 6:
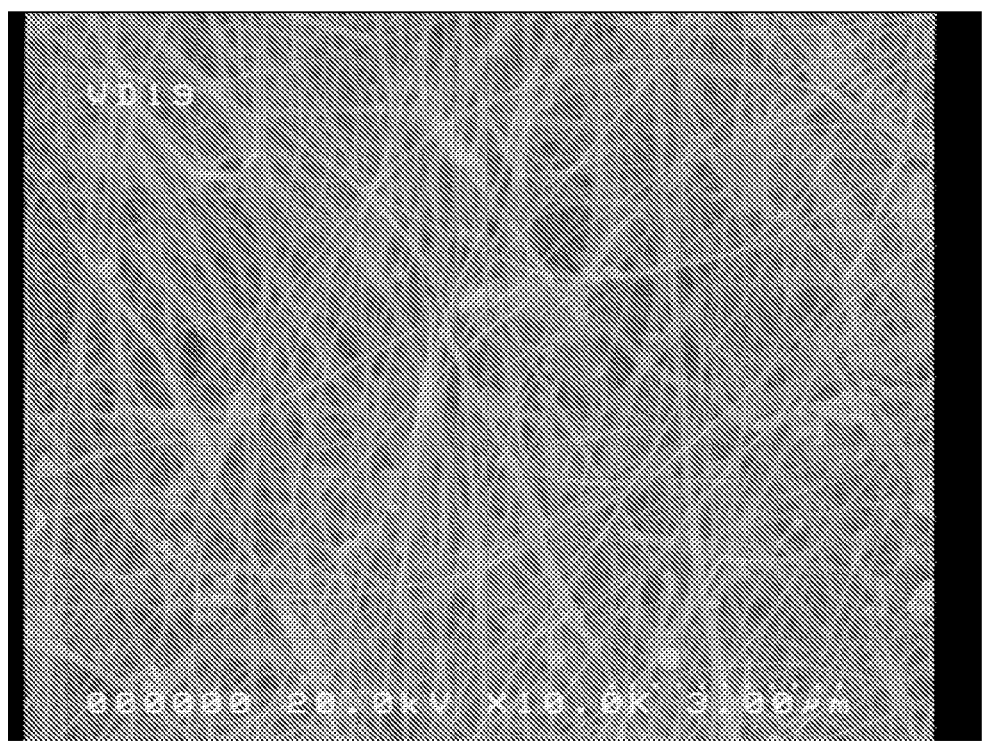
FIG. 6 is an SEM image of the silver nanobelt obtained in Example 3.

Synthesis of Silver (Ag) Nanobelt 3 mg of a silver nanobelt was obtained by the same method as Example 1, except that the reaction temperature was 60° C. and the reaction time was 10 hours. The SEM image of the obtained nanobelt is shown in FIG. 6. It is confirmed by the SEM image that the silver nanobelt has the same scale as Example 1.

Example 4

Figure 7:
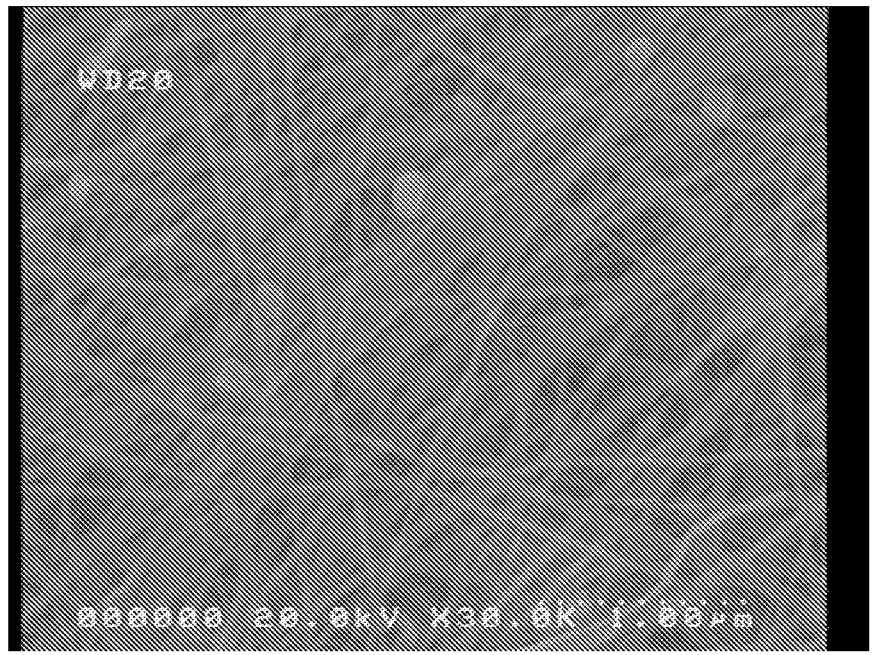
FIG. 7 is an SEM image of the silver nanobelt obtained in Example 4.

Synthesis of Silver (Ag) Nanobelt 15 mg of a silver nanobelt was obtained by the same method as Example 1 using P[Ani]$_{0.5}$-[N-(1',3'-phenylenediamino)-3-propane sulfonate]$_{0.5}$ prepared in Synthesis Example 3. The SEM image of the silver nanobelt is shown in FIG. 7. It is confirmed by the SEM image that the silver nanobelt has almost the same scale as Example 1.

Example 5

Figure 8:
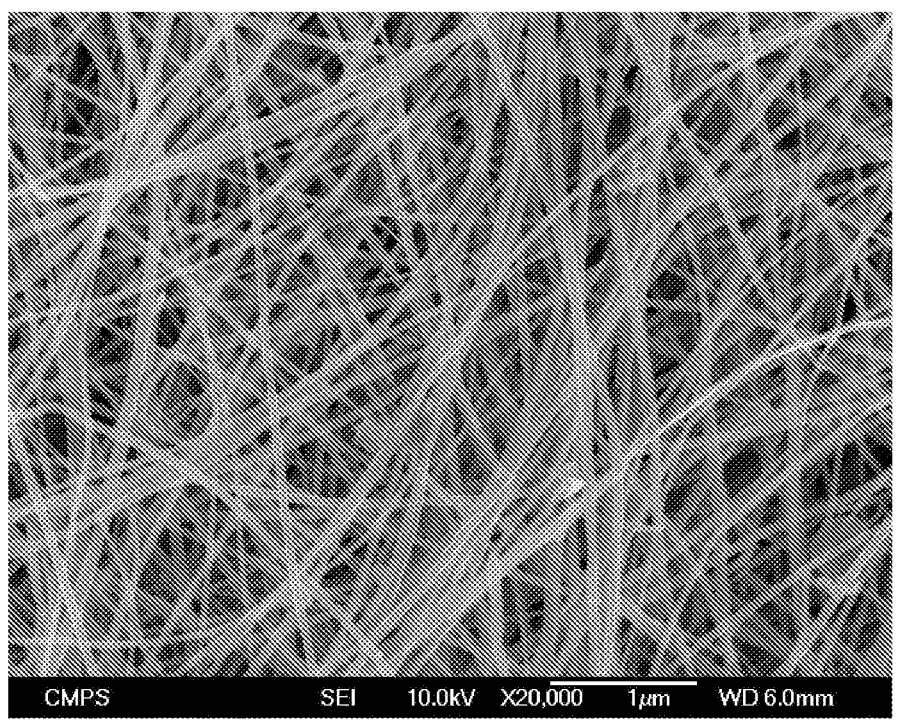
FIG. 8 is an SEM image of the silver nanobelt obtained in Example 5.

Synthesis of Silver (Ag) Nanobelt 7 mg of a silver nanobelt was obtained by the same method as Example 1 using P[pyrrole]$_{0.5}$-[N-(1',3'-phenylenediamino)-3-propane sulfonate]$_{0.5}$ prepared in Synthesis Example 4. The SEM image of the obtained silver nanobelt is shown in FIG. 8. It is confirmed by the SEM image that the silver nanobelt has almost the same scale as Example 1.

D. Manufacture of a Transparent Conductive Film and Evaluation of Conductivity

Example 6

Preparation of a Conductive Ink Composition and a Transparent Conductive Film 10 mg of the silver nanobelt mixture obtained in Example 1 was mixed with 30 ml of ethanol in 20 ml of DMF, and ultrasonificated to obtain a mixed dispersion of the silver nanobelt and MWNT, i.e., a conductive ink composition. The conductive ink composition was bar coated on a 10 cm×10 cm PET substrate, and dried at 120° C. to remove the solvent, thereby preparing a transparent conductive film.

Transmittance of the obtained transparent conductive film was measured by UV/Vis spectrophotometer, and conductivity was measured by 4-probe method. As the measurement results, it showed 85% transmittance and sheet resistance of 360 ohm/square. In this Example, it is confirmed that in case a transparent conductive film is formed from a silver nanobelt, a conductive film exhibiting excellent conductivity and transparency may be formed without progressing a high temperature firing during the preparation process.

What is claimed is:

1. A method for preparing a metal nanobelt comprising reacting a conductive polymer and a metal salt.

2. The method of claim 1, wherein the reaction is conducted at a temperature of 1 to 70° C. and a pressure of 1 to 2 atm, for 0.1 hours to 14 days.

3. The method of claim 1, wherein in the reaction step, the metal is reduced and arranged on the conductive polymer so as to form the metal nanobelt.

4. The method of claim 1, wherein the metal salt is a salt of a metal selected from the group consisting of gold (Au), silver (Ag), copper (Cu,), platinum (Pt), palladium (Pd), iridium (Ir), rhodium (Rh), and ruthenium (Ru).

5. The method of claim 1, wherein the conductive polymer comprises at least one polymer selected from the group consisting of polyaniline, polypyrrole, polythiophene, and a copolymer thereof.

6. The method of claim 1, wherein the reaction is conducted in a solvent selected from the group consisting of water, alcohol, acetone, methyl ethyl ketone (MEK), ethylene glycol, formamide (HCOOH), dimethylformamide (DMF), dimethylacetamide (DMAc), dimethyl sulfoxide (DMSO), N-methylpyrrolidone (NMP), and a mixed solvent thereof.

7. The method of claim 1, wherein the reaction is conducted in the presence of a reducing agent.

8. The method of claim 7, wherein the reducing agent is selected from the group consisting of a multivalent phenol-based compound, an amine-based compound, a pyridine-based compound, a multivalent alcohol-based compound, and a combination thereof.

9. The method of claim 1, wherein in the reaction step, a metal nanobelt with a length of 500 nm or more, a length/width ratio of 10 or more, and a width/thickness ratio of 3 or more is formed.

10. The method of claim 9, wherein the metal nanobelt has a length of 1 μm-2000 μm, a width of 30 nm-100 μm and a thickness of 10-500 nm.

11. The method of claim 9, wherein the metal nanobelt does not substantially comprise a metal oxide.

12. The method of claim 9, wherein the metal nanobelt comprises at least one metal selected from the group consisting of gold (Au), silver (Ag), copper (Cu,), platinum (Pt), palladium (Pd), iridium (Ir), rhodium (Rh), and ruthenium (Ru).

* * * * *